United States Patent
Geiser

(10) Patent No.: US 7,628,004 B2
(45) Date of Patent: Dec. 8, 2009

(54) MACHINE FOR GATHERING PRODUCTS SUCH AS GRASS

(75) Inventor: Jens Geiser, Dettum (DE)

(73) Assignee: Kuhn S.A., Saverne (FR)

( * ) Notice: Subject to any disclaimer, the term of this patent is extended or adjusted under 35 U.S.C. 154(b) by 445 days.

(21) Appl. No.: 10/549,573

(22) PCT Filed: Mar. 9, 2004

(86) PCT No.: PCT/FR2004/000562

§ 371 (c)(1), (2), (4) Date: Jun. 30, 2006

(87) PCT Pub. No.: WO2004/085115

PCT Pub. Date: Oct. 7, 2004

(65) Prior Publication Data

US 2006/0248870 A1    Nov. 9, 2006

(30) Foreign Application Priority Data

Mar. 17, 2003  (FR)  .................................. 03 03442

(51) Int. Cl.
*A01D 57/00*  (2006.01)
(52) U.S. Cl. .................................. 56/192; 56/DIG. 21
(58) Field of Classification Search .................... 56/192, 56/228, 15.9, DIG. 21

See application file for complete search history.

(56) References Cited

U.S. PATENT DOCUMENTS

| | | | | |
|---|---|---|---|---|
| 3,214,002 A * | 10/1965 | Kirkpatrick et al. | ...... | 198/369.7 |
| 4,429,517 A * | 2/1984 | Lohrentz et al. | .............. | 56/181 |
| 4,487,004 A * | 12/1984 | Kejr | ........................... | 56/14.4 |
| 4,519,190 A | 5/1985 | Blakeslee | | |
| 6,205,757 B1 * | 3/2001 | Dow et al. | ..................... | 56/366 |
| 6,679,038 B2 * | 1/2004 | Walch et al. | .................. | 56/192 |
| 7,310,929 B2 * | 12/2007 | Dow et al. | ..................... | 56/192 |
| 7,380,393 B2 * | 6/2008 | Stutzmann | ..................... | 56/377 |
| 2003/0074876 A1 | 4/2003 | Patterson et al. | | |

FOREIGN PATENT DOCUMENTS

| | | |
|---|---|---|
| CA | 1 267 292 | 4/1990 |
| DE | 196 45 629 | 5/1998 |

* cited by examiner

Primary Examiner—Alicia M Torres
(74) *Attorney, Agent, or Firm*—Oblon, Spivak, McClelland, Maier & Neustadt, L.L.P.

(57) ABSTRACT

A machine for gathering products such as grass, including a main frame bearing a first lateral gathering device with which a first windrowing device is associated and a second lateral gathering device with which a second windrowing device is associated. The main frame further bears a central gathering device with which a third windrowing device is associated and the central gathering device and the third windrowing device can be moved relative to the main frame into a first and a second position.

19 Claims, 4 Drawing Sheets

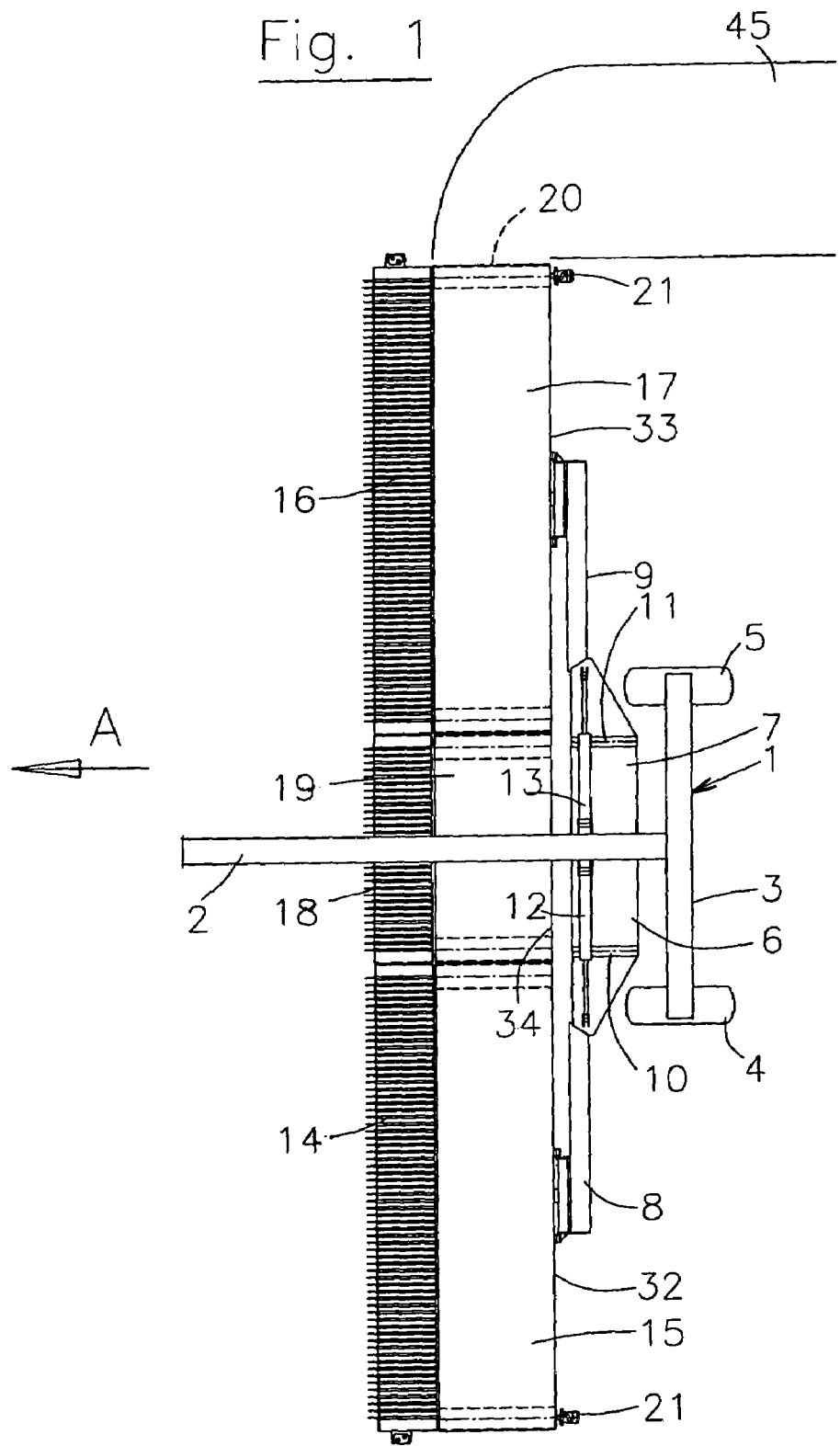

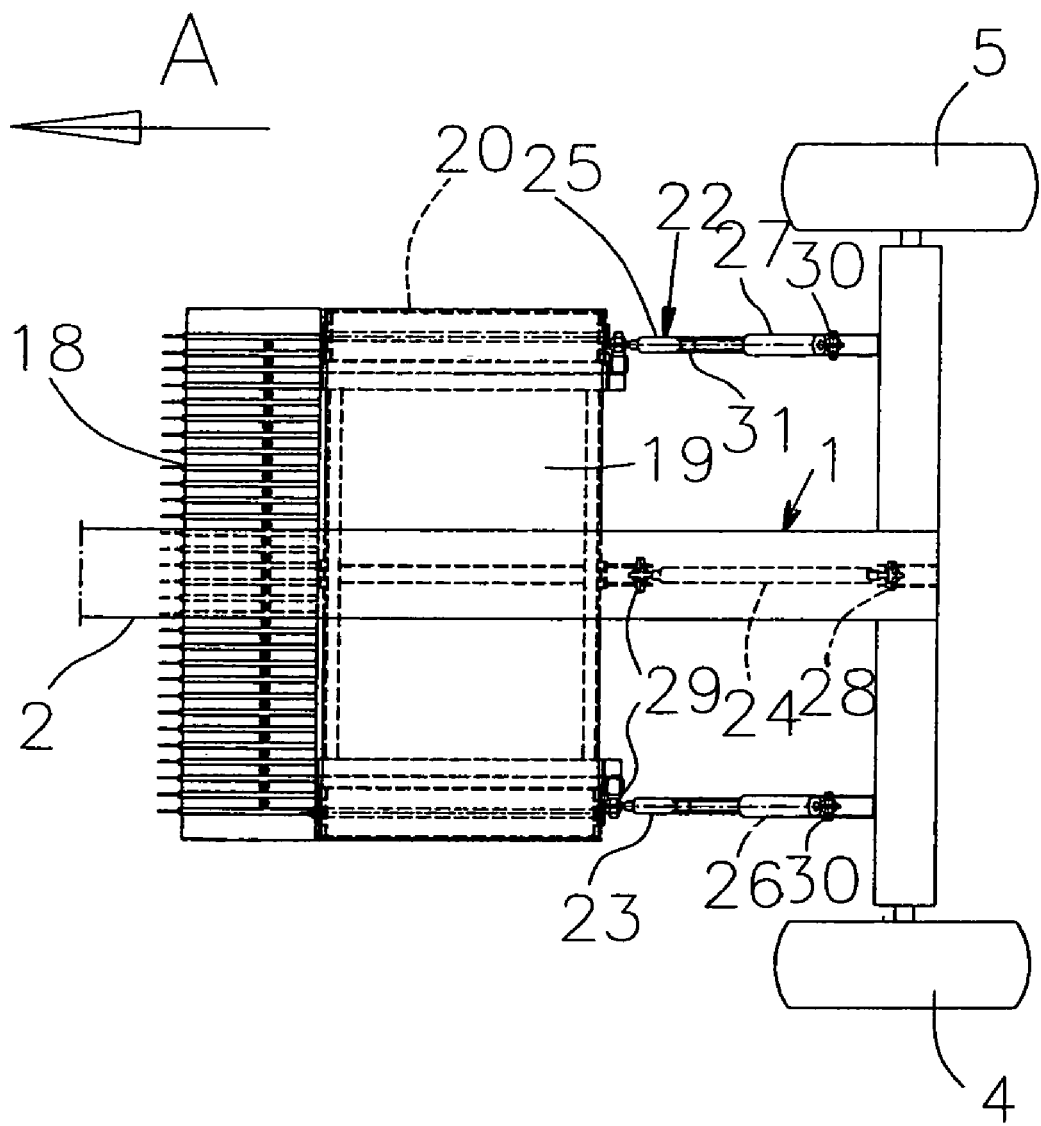

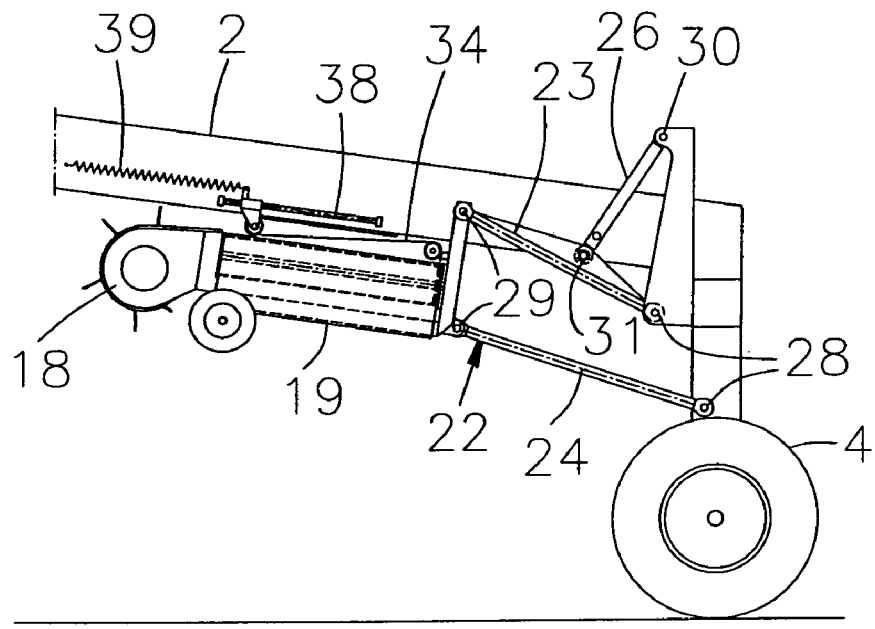
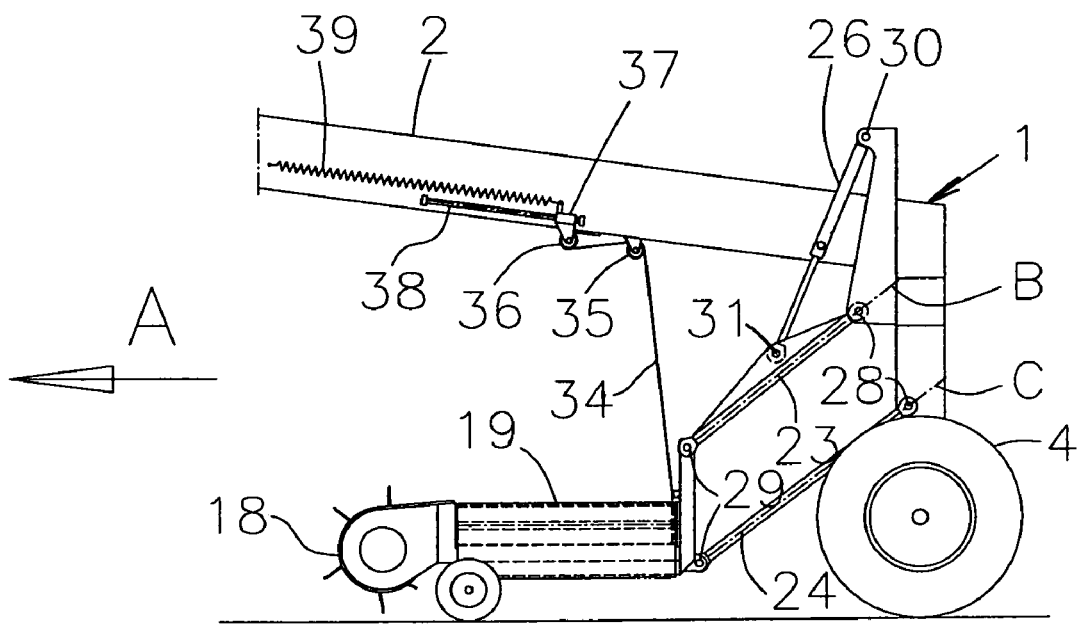

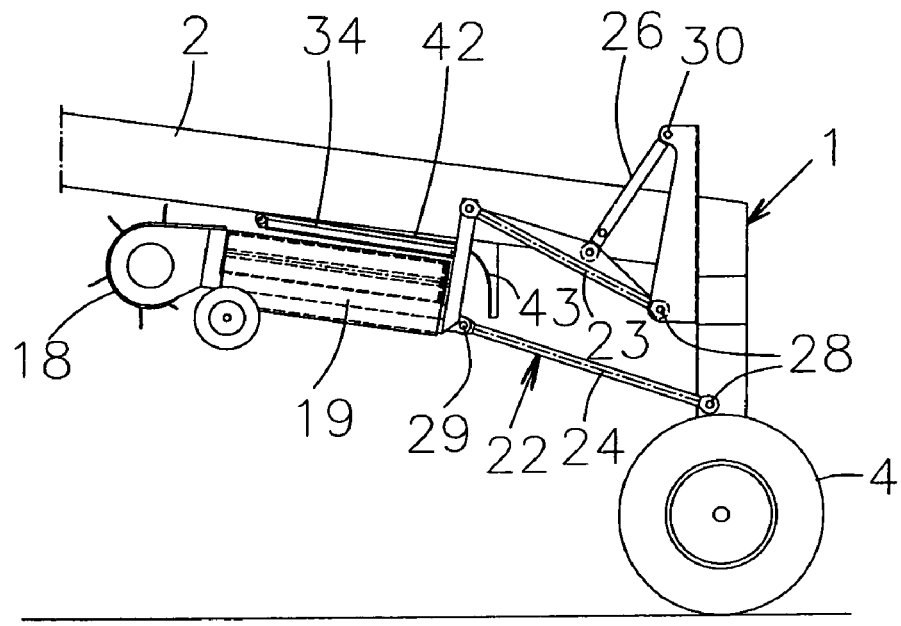
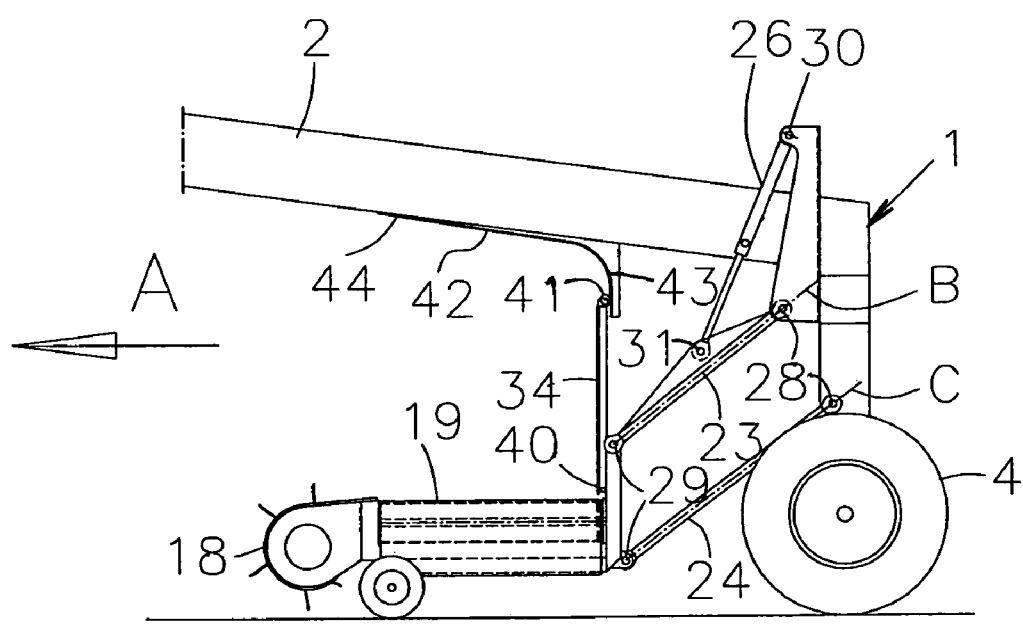

MACHINE FOR GATHERING PRODUCTS SUCH AS GRASS

The present invention relates to a machine for gathering products such as grass, hay or straw, which lie on the ground, comprising in particular a main frame bearing a first lateral gathering device with which a first windrowing device is associated and a second lateral gathering device with which a second windrowing device is associated.

In a known machine of this kind, the gathering devices are separate and lie one of them on the right-hand side and the other on the left-hand side of the main frame. This arrangement allows products already gathered into windrows to be gathered together and displaced laterally without them coming into contact with the ground. They can then be deposited on one side or both sides of the machine to form windrows of larger volume.

This machine is, in particular, not appropriate for gathering and windrowing products spread over the entire surface of the ground. Its field of use is therefore relatively restricted.

It is an object of the present invention to overcome the drawbacks of the known machines. The present invention intends in particular to provide a machine which is both capable of gathering products already in windrows and products spread over the entire surface of the ground and of displacing them laterally without them being in contact with the ground.

To this end, an important feature of the invention consists in the fact that the main frame additionally bears a central gathering device with which a third windrowing device is associated and in the fact that said central gathering device and said third windrowing device can be moved relative to the frame in such a way that they can be transposed into a first position in which they are aligned with the first and second gathering devices and windrowing devices and are substantially adjacent to these and into at least a second position in which they are offset relative to said first and second gathering devices and windrowing devices. In this second position, the central gathering device and the third windrowing device can, in particular, be offset heightwise.

In the first position, the gathering devices gather the products over the entire width of the machine. These products may thus be spread over the surface of the ground or alternatively may be in the form of small-volume windrows already formed, for example, by means of a mower/windrower. The gathered products therefore reach the windrowing devices which displace them laterally from one to the other without them coming into contact with the ground and deposit them on one of the sides of the machine in the form of a large windrow.

In the second position, the first and second gathering devices gather the products which lie on the ground in the form of small-volume windrows and cause them to reach their respective windrowing devices. The latter can then be driven in such a way that they displace these products toward the center of the machine in order to form a central windrow of larger volume. It is, however, also possible to drive the windrowing devices in such a way that they displace the products towards the outermost sides of the machine with a view to forming large windrows in several passes.

According to another feature of the invention, the third windrowing device is associated with a deflector which can be moved with respect to said windrowing device. This deflector is arranged in such a way that it moves automatically from a substantially vertical position that it occupies when the central gathering device and the third windrowing device are in their first position, into a substantially horizontal position when said devices are occupying their second position, and vice versa.

Other features and advantages of the invention will become apparent from the description which will follow and which refers to the attached drawings which, by way of nonlimiting examples, depict some embodiments of the machine according to the invention.

In these drawings:

FIG. 1 depicts a partial view from above of a machine according to the invention in the work position, FIG. 2 depicts, on a larger scale, a view from above of the central gathering device of the machine, FIG. 3 depicts a side view of the central gathering device illustrated in FIG. 2, FIG. 4 depicts a view similar to that of FIG. 3, with the central gathering device in another position, FIG. 5 depicts a side view of an embodiment alternative of the central gathering device, FIG. 6 depicts a view similar to that of FIG. 5, with the central gathering device in another position.

As depicted in FIG. 1, the machine according to the invention comprises a main frame (1). This consists of a central beam (2) which has, at its front end, a coupling system (not depicted) for attaching it to a tractor that drives the machine and causes it to move along in a direction of forward travel (A). The beam (2) at its rear end has a cross-beam (3) with two shifting wheels (4, 5) resting on the ground. This beam (2) additionally comprises two lateral supports (6 and 7) on which arms (8 and 9) are articulated by means of axes (10 and 11) which are substantially parallel to the beam (2). Between the beam (2) and the arms (8 and 9) there are also arranged some hydraulic rams (12 and 13) to allow these arms (8 and 9) to be moved about said axes (10 and 11) in substantially vertical planes.

The outside end of the first arm (8) bears a first gathering device (14) of the pick-up type with which a first windrowing device (15) is associated. These two devices (14 and 15) form an assembly that can move over the ground by means of wheels or skids situated under said devices.

The outside end of the second arm (9) bears a second gathering device (16) of the pick-up type with which a second windrowing device (17) is associated. These also form an assembly that can move over the ground by means of wheels or skids placed under said devices (16 and 17).

The main frame (1) additionally bears a central gathering device (18) of the pick-up type with which a third windrowing device (19) is associated. Each windrowing device (15, 17 and 19) consists of a conveyor belt guided by rolls (20). One of the guide rolls (20) of the conveyor belt of each of the windrowing devices (15, 17 and 19) is rotationally driven, for example by means of a hydraulic motor (21), in such a way that the corresponding belt moves in its upper part to the right or to the left. The gathering devices (14, 16 and 18) of the pick-up type may also be driven by hydraulic motors.

The central gathering device (18) and the third windrowing device (19) are arranged in such a way as to be movable heightwise relative to the main frame (1). They may thus be transposed into a first position in which they are aligned with the first and second gathering devices (14 and 16) and the first and second windrowing devices (15 and 17) and are substantially adjacent to these, and into a second position in which they are offset relative to said first and second gathering devices (14 and 16) and windrowing devices (15 and 17). In this second position they may be offset heightwise so that they are out of operation, that is to say do not come into contact with the products. The central gathering device (18) and the third windrowing device (19) are connected to the main frame (1) by means of a lift mechanism (22) (see FIGS. 2 to 6). This is made up of connecting arms (23, 24, 25) and of one or several hydraulic rams (26, 27). These connecting arms (23, 24, 25) are articulated to the main frame (1) by means of axes (28) and are articulated to the third windrowing device (19), which is connected to the central gathering device (18), by means of axes (29). These articulation axes (28 and 29) are substantially horizontal and perpendicular to the direction of forward travel (A). The hydraulic rams (26 and 27) are articulated to the main frame (1) by means of axes (30) and are articulated to the connecting arms (23 and 25) by means of axes (31). These axes (30 and 31) are substantially parallel to the articulation axes (28 and 29) of the connecting arms (23, 24 and 25).

The connecting arms (23, 24 and 25) lie in two planes (B and C) offset relative to one another in the heightwise direction. In the example depicted, the lift mechanism (22) comprises three connecting arms (23, 24 and 25) of which two (23 and 25) lie in the same plane (B) and of which the third (24) lies in the second plane (C). This third arm (24) lies substantially at equal distances from the other two arms (23 and 25). The lift mechanism could also comprise four connecting arms lying two by two in the same plane (B or C).

Deflectors (32, 33, 34) for guiding the displaced products are arranged on the rear side of the windrowing devices (15, 17 and 19). It is apparent from FIGS. 3 to 6 that the deflector (34) associated with the third windrowing device (19) can be moved into at least two different positions. This deflector (34) is substantially vertical when the central gathering device (18) and the third windrowing device (19) are in their first position and is substantially horizontal when said devices are in their second position. The switch from the substantially vertical position to the substantially horizontal position and vice versa occurs automatically when the devices (18 and 19) are moved by means of the lift mechanism (22).

In the example depicted in FIGS. 3 and 4, the deflector (34) is flexible. It is fixed at one of its ends to the third windrowing device (19) and at its other end to the beam (2) of the main frame (1). It passes over two rollers (35 and 36) of which one (35) is fixed relative to the main frame (1) and the other is able to move along the beam (2). The moving roller (36) is mounted on lateral supports (37) which can move on longitudinal guides (38) fixed to the flanks of the beam (2) of the main frame (1). At least one of the lateral supports (37) is connected to a draw-spring (39) which pulls it in the direction of forward travel (A).

In the example depicted in FIGS. 5 and 6, the deflector (34) is rigid. At one of its ends it is articulated to the third windrowing device (19) by means of a substantially horizontal axis (40). The other end of this deflector (34) has a roller (41). The latter is guided on a rail (42) which is connected to the beam (2). This rail (42) has two parts (43 and 44), one of which is substantially vertical and the other of which is substantially horizontal.

During work, the machine is attached to a tractor which moves it along in the direction (A). In the first work position the arms (8 and 9) are lowered into a substantially horizontal position with the aid of the hydraulic rams (12 and 13), so that the first and second gathering devices (14 and 16) rest on the ground. The central gathering device (18) is also lowered by means of the lift mechanism (22) so that it touches the ground. The three gathering devices (14, 18 and 16) then lie side by side in a same line. They are driven in such a way that they gather, over the entire width of the machine, the products spread out on the ground and convey them to the windrowing devices (15, 19 and 17). The latter also are driven and displace said products, without them being in contact with the ground, to one of the sides of the machine with a view to forming a large lateral windrow (45). The deflectors (32, 34 and 33) are substantially vertical and prevent the products from slipping to the rear side of the windrowing devices (15, 19 and 17).

In the second work position, the first and second gathering devices (14 and 16) and the corresponding windrowing devices (15 and 17) occupy the same positions as those described hereinabove. The central gathering device (18) and the corresponding windrowing device (19) are displaced upward, by means of the lift mechanism (22), close to the beam (2). For this purpose, the hydraulic rams (26 and 27) are made to shorten. They therefore cause the connecting arms (23, 24 and 25) to pivot about their articulation axes (28) so that said raising is performed. The central gathering device (18) and the third windrowing device (19) are therefore offset heightwise relative to the adjacent devices and are somewhat out of operation.

At the same time, the flexible deflector (34) according to the embodiment depicted in FIGS. 3 and 4, is pulled forward by the spring (39) and the moving roller (36) the lateral supports (37) of which move along the guides (38). This deflector (34) therefore folds around the rollers (35 and 36) and occupies a substantially horizontal position between the beam (2) and the windrowing device (19).

In the embodiment according to FIGS. 5 and 6, the deflector (34) is guided by the rail (42) during said raising. It therefore folds forward about the articulation axis (40) and positions itself in a substantially horizontal position between the beam (2) and the windrowing device (19) so as to allow the latter to be raised as far as possible.

In this second work position, the first and second gathering devices (14 and 16) are driven in such a way that they gather the products on the ground and convey them to the corresponding windrowing devices (15 and 17). The latter can therefore be driven in such a way that they displace these products towards the middle of the machine to form a central windrow in the space freed by the third windrowing device (19). They can thus be driven in such a way that they displace the products towards the sides to form lateral windrows. In this second work position the machine can in particular gather small windrows and group them together to form larger windrows. The latter can then be collected, for example, by means of a baler or a silo loader.

For transport, the central gathering device (18) and the third windrowing device (19) are raised into the position that they occupy in the second work position described hereinabove. The deflector (34) is then automatically folded into its substantially horizontal position. The arms (8 and 9) with their gathering and windrowing devices (14, 15, 16 and 17) are raised about the articulation axes (10 and 11) by means of the hydraulic rams (12 and 13) so as to reduce the width of the machine. In this position, the deflectors (32 and 33) which are associated with the first and second windrowing devices (15 and 17) may also be folded toward these devices (15 and 17) in order to reduce the bulk.

Obviously, the invention is not restricted to the embodiments described and depicted in the attached drawings. Modifications remain possible, particularly as regards the construction of the various elements or by substituting technical equivalents, without thereby departing from the field of protection.

The invention claimed is:

1. A machine for gathering products that lie on the ground, comprising:
a main frame bearing a first lateral gathering device with which a first windrowing device is associated and a second lateral gathering device with which a second windrowing device is associated;

wherein the main frame further bears a central gathering device with which a third windrowing device is associated; and wherein the central gathering device and the third windrowing device are configured to be moved relative to the main frame such that the central gathering device and the third windrowing device can be transposed into a first position in which the central gathering device and the third windrowing device are aligned with the first and second gathering devices and windrowing devices and are substantially adjacent to the first and second gathering devices and windrowing devices such that said first, second and central gathering devices are in contact with said products, and into at least a second position in which the central gathering device and the third windrowing device are offset relative to the first and second gathering devices and windrowing devices such that said first and second gathering devices are aligned with each other and in contact with said products but said central gathering device is not into contact with said products.

2. A machine as claimed in claim 1, wherein the central gathering device and the third windrowing device can be offset heightwise.

3. A machine as claimed in claim 1, wherein the central gathering device and the third windrowing device are connected to the main frame by a lift mechanism.

4. A machine as claimed in claim 3, wherein the lift mechanism includes connecting arms that are articulated to the main frame by axes that are substantially horizontal and perpendicular to a direction of forward travel and articulated to the third windrowing device, which is connected to the central gathering device, by axes that are substantially horizontal and perpendicular to the direction of forward travel.

5. A machine as claimed in claim 4, wherein the lift mechanism comprises at least one hydraulic ram that is articulated to the main frame and to a connecting arm.

6. A machine as claimed in claim 4, wherein the connecting arms lie in two planes that are offset relative to one another in the heightwise direction.

7. A machine as claimed in claim 6, wherein the lift mechanism comprises first, second, and third connecting arms of which the first and second arms lie in the same plane and of which the third arm lies in a second plane.

8. A machine as claimed in claim 7, wherein the third arm lies substantially at equal distances from the first and second arms.

9. A machine as claimed in claim 1, further comprising deflectors configured to guide displaced products arranged on rear sides of the windrowing devices.

10. A machine as claimed in claim 9, wherein associated with the third windrowing device is a deflector configured to be moved relative to the third windrowing device.

11. A machine as claimed in claim 10, wherein the deflector is configured to be moved automatically between a substantially vertical position that it occupies when the central gathering device and the third windrowing device are in the first position, and a substantially horizontal position that it occupies when they are in their second position.

12. A machine as claimed in claim 11, wherein the deflector is flexible and is fixed at one of its ends to the third windrowing device and at its other end to the main frame.

13. A machine as claimed in claim 12, wherein the deflector passes over first and second rollers of which the first roller is fixed relative to the main frame and the second roller is configured to move along the main frame.

14. A machine as claimed in claim 13, wherein the moving roller is mounted on lateral supports configured to move on guides fixed to the main frame.

15. A machine as claimed in claim 14, wherein at least one of the lateral supports is connected to a draw-spring.

16. A machine as claimed in claim 11, wherein the deflector is rigid and is articulated at one of its ends to the third windrowing device by an axis.

17. A machine as claimed in claim 15, wherein the other end of the deflector is guided by a roller on a rail fixed to the main frame configured to cause the deflector to move between the substantially vertical position and the substantially horizontal position.

18. A machine as claimed in claim 1, wherein in said first position, said first, second and third windrowing devices are aligned with each other and can be driven to displace said products to form a lateral windrow at one side of said machine.

19. A machine as claimed in claim 18, wherein in said second position, said first, second and third windrowing devices are positioned such that said first and second windrowing devices can be driven to displace said products to form a central windrow in a space freed by the central gathering device offset relative to said first and second windrowing devices.

* * * * *